Figure 1:
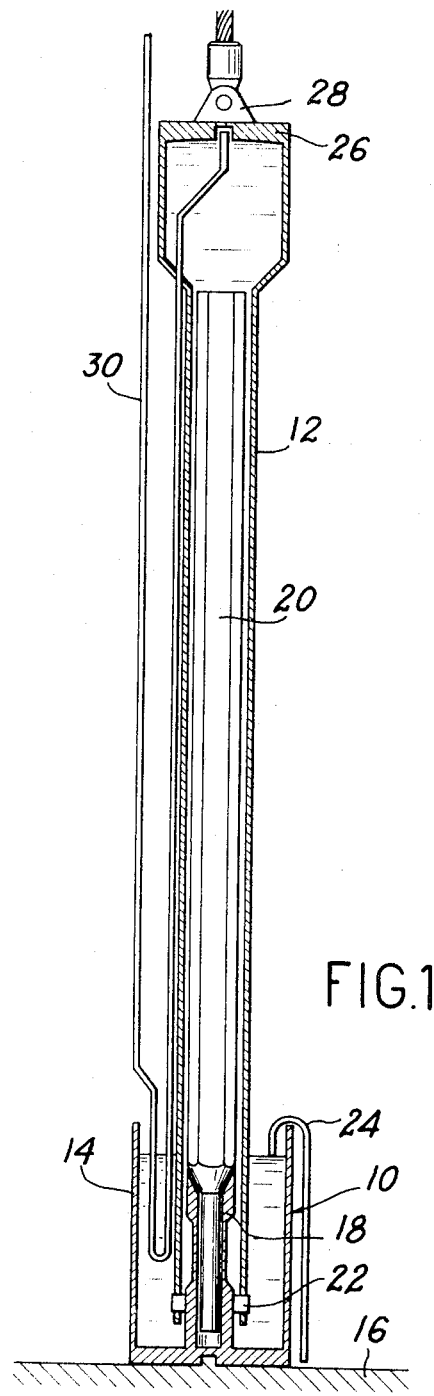

United States Patent [19]

Renaux

[11] 3,848,423

[45] Nov. 19, 1974

[54] HANDLING SYSTEM FOR NUCLEAR FUEL ASSEMBLIES

[75] Inventor: Charley Renaux, Jouques, France

[73] Assignee: Commissariat A L'Energie Atomique, Paris, France

[22] Filed: Feb. 9, 1972

[21] Appl. No.: 224,813

[30] Foreign Application Priority Data
Feb. 9, 1971   France .............................. 71.04263

[52] U.S. Cl. ......................... 62/45, 176/28, 176/37, 176/87
[51] Int. Cl. ............................................. F17c 7/00
[58] Field of Search ............ 176/27, 28, 29, 37, 87; 62/45

[56] References Cited
UNITED STATES PATENTS
2,999,060   9/1961   Teitel ................................... 176/27
3,165,447   1/1965   Stephenson ...................... 176/28 X Primary Examiner—Meyer Perlin
Assistant Examiner—Ronald C. Capossela
Attorney, Agent, or Firm—Cameron, Kerkam, Sutton, Stowell & Stowell

[57] ABSTRACT

The invention relates to a handling system for nuclear fuel assemblies. The system comprises a trough on the base of a tank which is filled with sodium. The trough is open at its top and has a seating for receiving a fuel assembly. The system also includes a bell-shaped member which is open at the bottom and is provided with means for temporarily locking the bell-shaped member to the trough in a position over the fuel assembly. A U-tube connects the closed top of the bell-shaped member to the exterior and the trough is provided with a siphon device for emptying the trough.

4 Claims, 7 Drawing Figures

HANDLING SYSTEM FOR NUCLEAR FUEL ASSEMBLIES

This invention relates to fuel assembly handling system for high power density liquid-cooled nuclear reactors.

Fuel assemblies intended for such reactors, and particularly molten sodium cooled fast-neutron reactors, evolve a high residual power for a long time after they have been withdrawn from the core. One of the main problems in handling them is to dissipate the residual thermal power evolved by the fuel without excessive heating thereof. The solution generally adopted is to keep the fuel assembly in a bath of the coolant during transportation so as to maintain high thermal transfer. Fast neutron reactor assemblies, in particular, are generally kept in a vessel called a coffin which is occupied by sodium during transport. Unfortunately, the practical solutions used heretofore have serious disadvantages.

A first solution, which is the most reliable, is to use a coffin of a height at least equal to that of the assembly. The coffin is immersed in a tank occupied by sodium. The assembly is lifted from its storage station in which it is immersed in the sodium, and then introduced into the coffin by being lowered into the same. The coffin occupied by the assembly is then removed from the tank. The disadvantage of this solution is that it requires a tank in which the level occupied by the sodium is equal to twice the height of the assembly at least, since the assembly must be kept in the sodium during its transfer from the storage station to the coffin.

The second solution at present in use in to use a coffin, the base of which is not solid but provided with a valve which can open an aperture sufficient to allow the assembly to pass. This coffin with the valve open is lowered vertically over the assembly and engaged on the latter. When the assembly is fully in the coffin the valve is closed again. The coffin is then removed from the sodium. Although this solution has the advantage of requiring a lower sodium level than the previous solution, it nevertheless has the disadvantage of rendering proper operation dependent upon a valve which must be remote-controlled.

The present invention has as its object to provide a fuel assembly handling system which satisfies practical requirements better than the prior art systems, more particularly in as much as it gives safety practically equivalent to that of the prior art systems using a solid-bottom coffin, while requiring much less vertical space and a lower coolant level, of the same magnitude as that required with the valved coffin systems.

To this end, the handling system according to the invention, comprises a support provided with a trough open at the top and an assembly receiving seating in the trough, and a bell the open bottom part of which is provided with means cooperating with the support in order temporarily to lock the bell to the support in a position such that its lower edge is below the opening of the trough, the bell bearing a U-tube which connects the top closed part of the bell to the exterior and discharges to the exterior at a level at least equal to that where it discharges into the bell.

Preferably, the bottom point of the U-tube is at a level such that it is very much below the top opening of the trough. The top part of the bell can then be provided with gripping means which are engaged by a gripper adapted to impart vertical and rotary movements to the bell. Finally, in order to obviate any appreciable splashing of coolant from the trough, the latter is advantageously provided with a siphon which empties the trough to a predetermined level as soon as the free end of the siphon leaves the liquid coolant contained in the tank which contains the support when it is separated from the bell.

The invention also provides a method of using the above system. According to this method of transferring a fuel assembly in a liquid coolant from a tank in which it is completely submerged in said coolant and placed on the support, to another position, the bell occupied by a gaseous atmosphere which the liquid coolant entering the bell expels via the U-tube, is lowered on to the assembly, the bell is fixed on the support, the assembly comprising the bell and support is lifted, and then deposited at a reception station and then the bell is again separated from the support.

Thus filling and emptying are carried out automatically. The method may be applied to a plurality of assemblies simultaneously.

The invention will now be described by way of example with reference to the accompanying drawings in which:

FIG. 1 is a elevation of the system diagramatically along a vertical plane passing through the axis, and FIGS. 2a to 2f are very simplified views showing the sequence storage station to another.

The system illustrated in FIG. 1 is intended for handling fuel assemblies for molten sodium cooled fast-neutron reactors. The system consists essentially of a supporting base 10 and a bell 12, which will be described successively.

The support 10 may be considered as consisting of a trough 14 resting on the base of a tank occupied by sodium, and a seating 18. The trough is secured against rotation relatively to the base 16 of the tank by means diagrammatically illustrated in the form of a key system. The seating 18, which is concentric with the trough, terminates below the top edge of the latter. The seating is designed to receive the foot of a fuel assembly 20 and also has lugs 22 adapted to cooperate with members of the bell 12 to form a temporary locking system as will be seen hereinafter.

The support illustrated in FIG. 1 also includes a siphon 24, the object of which is to prevent splashes of sodium when the support and bell assembly is moved out of the sodium; as soon as the end of this siphon situated outside the support leaves the sodium, the siphon empties the trough as far as the level of the end situated inside the base, as shown in FIG. 1.

The bell 12 comprises a bottom part having a constant cross section and terminating in lugs intended to cooperate with the lugs 22, for example so as to form a bayonet connection, and a thickened top part, the end 26 of which is provided with a ring mounting 28 forming gripping means whereby the bell can be engaged to move it vertically and rotate it.

The bell 12 is provided with a U-tube 30 comprising a first arm leading into an opening provided for the purpose in the end 26 of the thickened part, and a second arm leading to atmosphere at a level slightly above that of the outlet of the first arm. For greater clarity, the second arm is shown in FIG. 1 in offset relationship to the bell, but it does in fact advantageously lie on it or is situated inside it. The bottom of the U-tube 30 is at a level such that it is immersed in the trough 14 when the bell is locked on the trough.

Figure 2A:
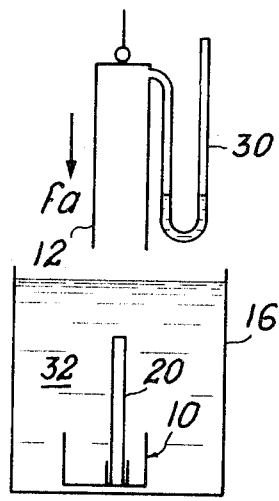
Figure 2B:
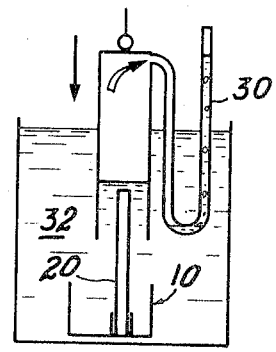
Figure 2D:
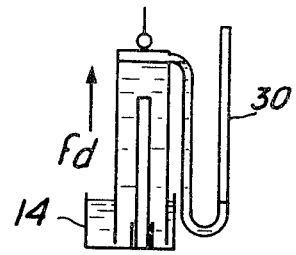
Figure 2D:
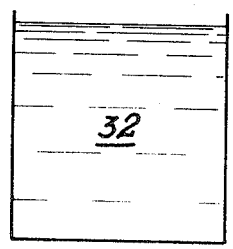

FIGS. 2a to 2f diagrammatically illustrate the use of the system described above. FIG. 2a shows a fuel assembly 20 disposed on the support 10 situated on the bottom of the storage tank 16 which is occupied by a mass of sodium 32 just sufficient to cover the assembly. The bell 12, which is occupied by the same gaseous atmosphere as that above the tank 16 (for example argon or helium) is vertically lowered above the assembly (arrow fa in FIG. 2a). When the bell 12 enters the mass 32 of molten sodium, the latter penetrates into the bell and expels the gas which occupies it. This gas escapes as soon as the internal pressure is sufficient to lift the column of liquid in the tube 30 to the position shown in FIG. 2b. Once the bell 12 is disposed on the support 10 it is locked by rotations. The dimensions of the bell and the position of the outlet of the first arm of the tube 30 therein are of course such that in this arrangement the assembly 20 is completely immersed in the sodium.

The bell 12 is then lifted again (arrows fc and fd in FIGS. 2c and 2d) and moves the support 10 and the assembly 20 with it. When the support leaves the sodium, the siphon 24 starts and partially empties the trough 14. The level of sodium also drops in the second arm of the U-tube 30 until it balances the column of sodium in the bell.

Figure 2E:
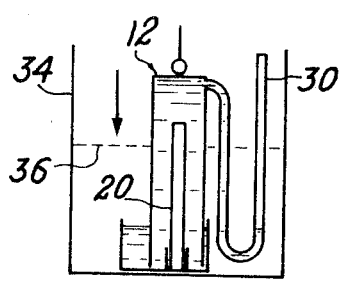
Figure 2F:
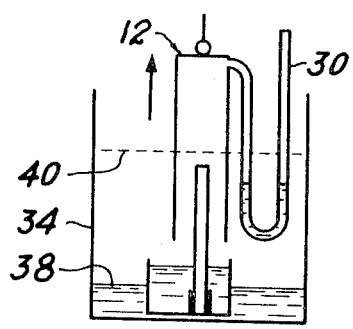

The system is then placed in a reception tank 34, which is shown empty in FIG. 2e, but which is generally partially filled with sodium (to the level 36 shown in broken lines), so that the assembly is immersed in the sodium after removal of the bell 12. The latter is unlocked by rotation and then removed (FIG. 2f). The bell 12 then empties into the tank 4 and brings the level either to 38 if the tank was previously empty, or to 40 if it was partially filled.

During this emptying, the sodium resumes equilibrium in the U-tube 30 until it occupies only the bottom part thereof.

The advantages of the system according to the invention will be apparent from the foregoing description. The free surface of the sodium in the tank in which the assembly is stored simply has to be slightly above the level at which the assembly evolves heat. The system includes no valve or similar device. Finally, filling and emptying are automatic with substantially complete safety.

The invention can be modified in various ways. For example, in some cases it may be advantageous to connect the U-tube 30 to an installation whereby sodium can be admitted or discharged and hence the bell can be emptied or filled. A variant of this kind retains the first two of the above advantages.

I claim:

1. A nuclear fuel assembly handling system for dissipating residual thermal power of the fuel, comprising a support, a trough on said support open at the top, a bell having an open bottom part, means on said open bottom part cooperating with said support to lock said bell to said support with the lower edge of said bell below the opening of said trough, a U-tube for said bell opening into the top closed part of said bell and to the exterior and discharging at a level at least equal to the opening of said U-tube into the bell.

2. A system according to claim 1, the bottom point of said U-tube being below the opening of said trough when said bell is locked thereon.

3. A system according to claim 1, said means for locking said bell and said support being actuated by relative rotation.

4. A system according to claim 1 including a tank containing liquid coolant, a siphon for said trough emptying said trough to a predetermined level as soon as the free end of said siphon leaves the liquid coolant in said tank when said support and said bell are removed from said tank.

* * * * *